Sept. 11, 1956 R. C. CARLSON 2,762,626

PHONOGRAPH RECORD PLAYER

Filed Nov. 23, 1949 10 Sheets-Sheet 1

INVENTOR.
Reuben C. Carlson
BY
J. D. Douglas
His Att'y.

Sept. 11, 1956 R. C. CARLSON 2,762,626

PHONOGRAPH RECORD PLAYER

Filed Nov. 23, 1949 10 Sheets-Sheet 2

INVENTOR.
Reuben C. Carlson
BY
J. D. Douglas
His Atty.

INVENTOR.
Reuben C. Carlson
BY
J. U. Douglas
His Att'y.

INVENTOR.
Reuben C. Carlson
BY
J. D. Douglas
His Atty.

INVENTOR.
Reuben C. Carlson
BY J. D. Douglas
His Atty.

PHONOGRAPH RECORD PLAYER

Filed Nov. 23, 1949 10 Sheets-Sheet 6

INVENTOR.
Reuben C. Carlson
BY
J. U. Douglas
His Atty

INVENTOR.

Reuben C. Carlson

BY

J. H. Douglas

His Att'y.

Sept. 11, 1956 R. C. CARLSON 2,762,626

PHONOGRAPH RECORD PLAYER

Filed Nov. 23, 1949 10 Sheets-Sheet 8

INVENTOR.
Reuben C. Carlson
BY
J. D. Douglas
His Atty.

Sept. 11, 1956 R. C. CARLSON 2,762,626

PHONOGRAPH RECORD PLAYER

Filed Nov. 23, 1949 10 Sheets-Sheet 9

INVENTOR.
Reuben C. Carlson
BY
J. D. Douglas
His Att'y.

Sept. 11, 1956

R. C. CARLSON 2,762,626

PHONOGRAPH RECORD PLAYER

Filed Nov. 23, 1949

10 Sheets-Sheet 10

INVENTOR.
Reuben C. Carlson
BY J. D. Douglas
His Att'y.

United States Patent Office 2,762,626

Patented Sept. 11, 1956

2,762,626

PHONOGRAPH RECORD PLAYER

Reuben C. Carlson, Chicago, Ill., assignor to Admiral Corporation, Chicago, Ill., a corporation of Delaware Application November 23, 1949, Serial No. 128,991

11 Claims. (Cl. 274—10)

This invention relates to new and useful improvements in phonograph record players, and more particulary to a record changer of the type wherein records, differing in size, are received, in any order, in a horizontal magazine which is spaced vertically and laterally from a horizontal turntable. More especially, the invention contemplates record player mechanism which is housed within a cabinet having a slot in one of the walls through which records are passed to the magazine, in any order, and from which magazine each of the records is automatically removed and transferred to the turntable for reproduction. A rejected record receiver to which each of the records is automatically transferred after it is rejected is also provided. The rejected record receiver is accessible to an operator of the record player.

Among the improvements which are incorporated in the present invention are those which afford convenience for the operator since there is no occasion for a record to be touched by the operator after it is passed through the slot, in the cabinet, until, the record or records in a group are manually removed from the rejected record receiver.

Other advantages of the invention will be set forth in part hereinafter and in part will be obvious herefrom, or may be learned by practice with the invention, the same being realized and attained by means of the instrumentalities and combinations pointed out in the appended claims.

The accompanying drawings, referred to herein and constituting a part hereof, illustrate one embodiment of the invention and together with the description serve to explain the principles of the invention.

Figure 1:
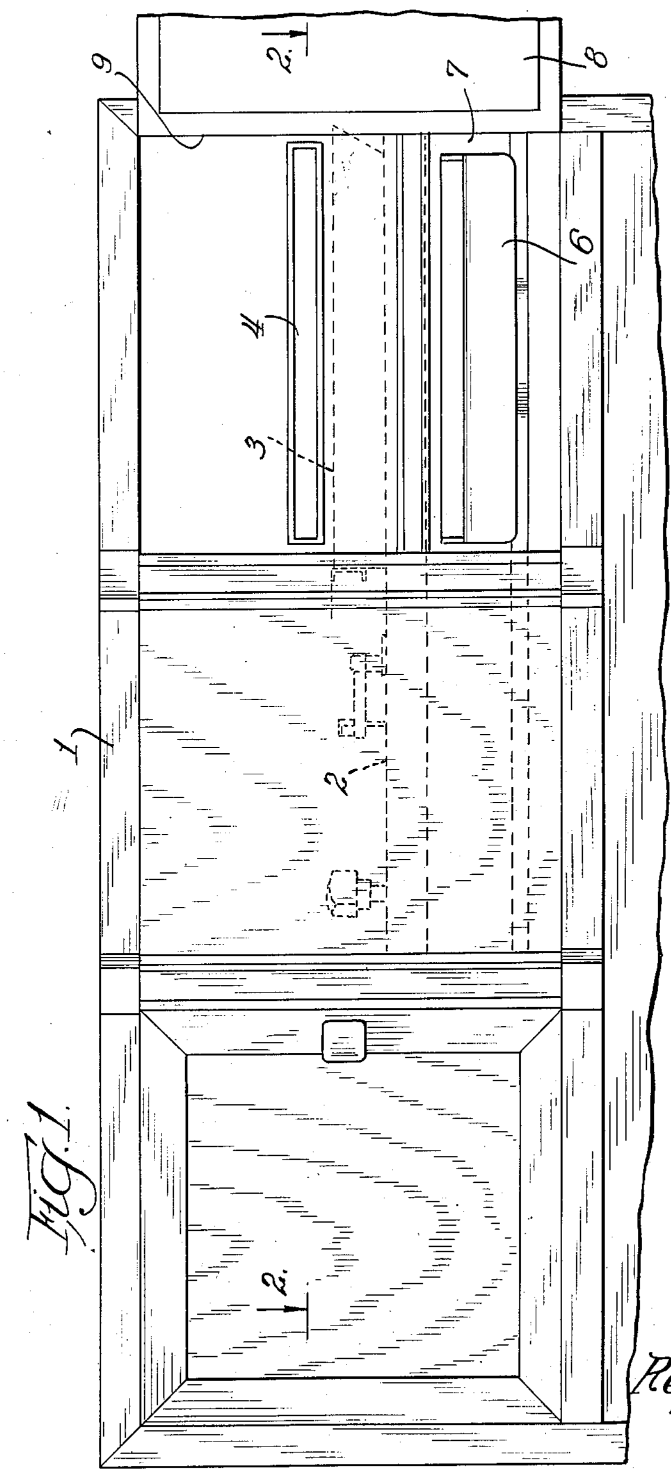
Fig. 1 is a fragmentary front elevational view of a cabinet of the class in which my invention is disposed.
Figure 2:
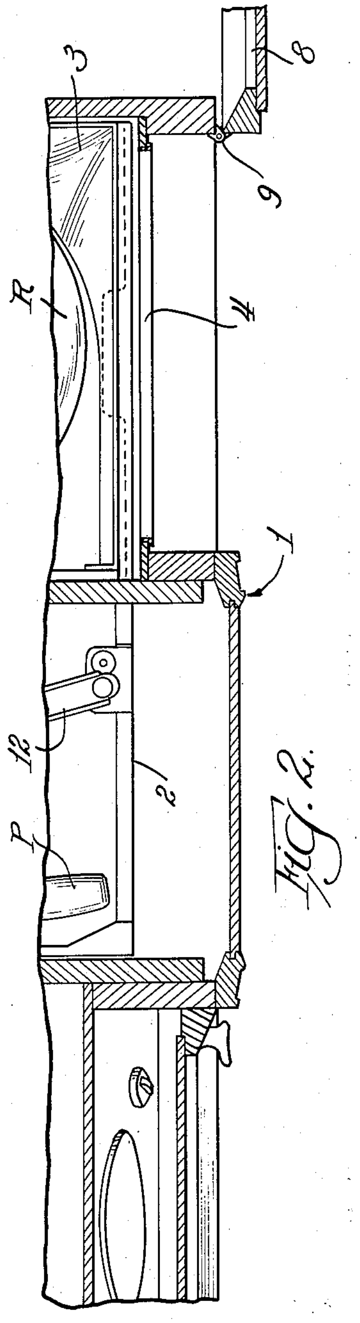
Fig. 2 is a transverse sectional view on line 2—2 of Fig. 1.

In Figs. 1 and 2, wherein for the purpose of illustration, is shown one embodiment of the invention, the reference character 1 is used to denote a cabinet, in its entirety, commonly known to the trade as a console. The space within the right and central portions of the cabinet is devoted to a phonograph record player while radio or television apparatus may be housed at the left thereof. The novel mechanism of my record player is indicated, in its entirety, by the character 2. It is of comparatively shallow proportions and includes a tray or magazine 3 into which records R, from one to four at a time, may be transferred by passing them through a slot 4 in one of the walls of the cabinet. After the records have been reproduced they are automatically released to a record receiver 6 which may be removed for retrieving the records manually, the tray being normally contained in a rejected record compartment 7 below the record player 2. The slot 4, receiver 6 and compartment 7 are obscured from view, when not in use, by a door 8 hinged at 9 to the cabinet.

Figure 3:
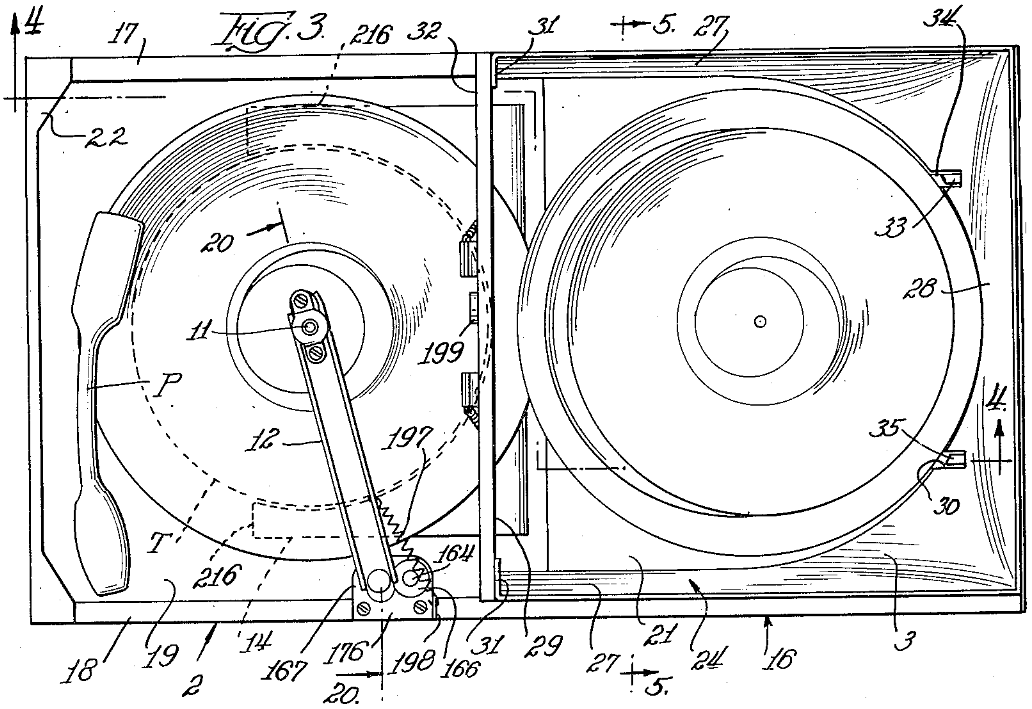
Fig. 3 is a top plan view of the invention.

In the ordinary course of operation, when the records are passed through the slot 4, they are beyond the control of the operator until they are withdrawn from the record receiver 6. It is therefore necessary to automatically isolate one of the records from the remaining records in the magazine 3 in order to pass it to a turntable T (Fig. 3). This may be effected by moving the axis of the bottom record of the magazine into a vertical medial plane longitudinal of the record player. When the axis of the record is in the medial plane, it is moved therein in a direction from right to left during which movement the center hole of the record receives a vertical pin 11 carried at the free end of a swingable arm 12.

Figure 9:
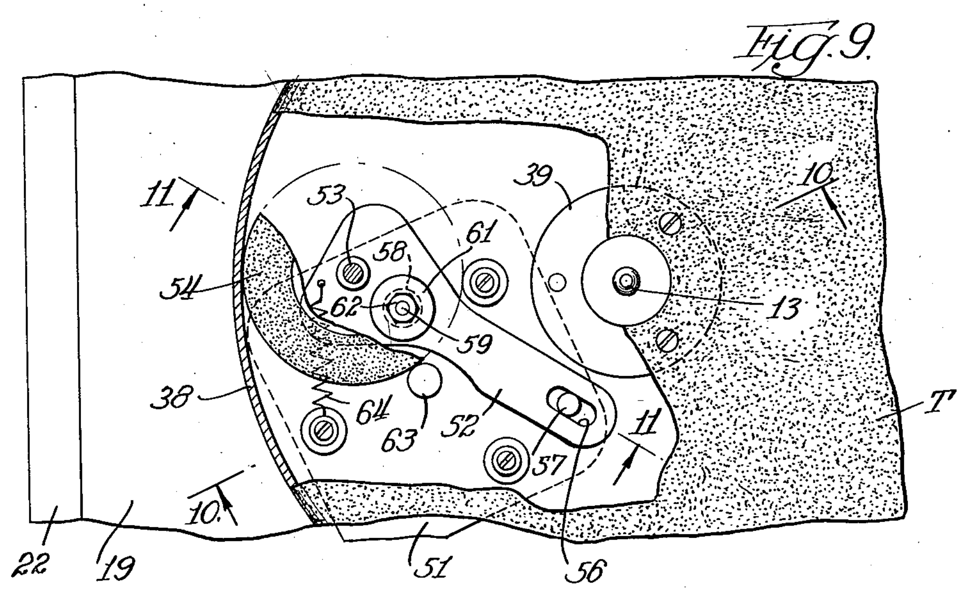
Fig. 9 is a fragmentary top plan view of the turntable drive mechanism, some of the parts being broken away to reveal the structure of other parts.
Figure 20:
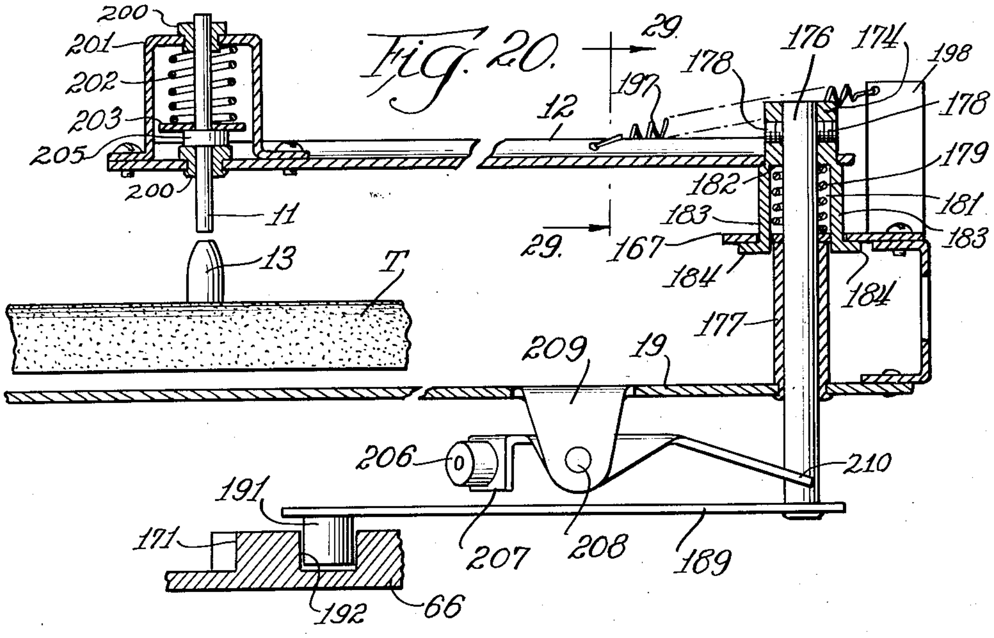
Fig. 20 is vertical sectional view drawn to an enlarged scale, and taken on line 20—20 of Fig. 3.

A counterclockwise motion of arm 12 then carries the record over the turntable until the motion of pin 11 is arrested in a position in which it is coaxial with the axis of the turntable and hence coaxial with a short spindle 13 (Figs. 9 and 20) fixed at the axis thereof and over which the record is threaded by gravity. The record, when supported by the turntable, is adapted to be reproduced by a pickup arm P. The support and mechanism by which the pickup arm is manipulated automatically with respect to the turntable will be described hereinafter. After reproduction of the record has been completed, a U-shaped record release member or elevator 14 lifts the record from engagement with the spindle 13 and again threads it over the pin 11. Then the record elevator 14 is moved to a predetermined position, in which it is inclined toward the receiver 6, the record remaining threaded over the pin 11. Concurrently with the record reaching this position, spring pressure, later to be referred to, is suddenly released to swing the arm 12 clockwise and horizontally while at the same time the center hole of the record moving downwardly over pin 11, due to the inclination of the elevator, finally reaches a point whereat it becomes disengaged from pin 11. However, at this time the record has acquired sufficient momentum to carry it into the receiver 6.

*Construction of frame and magazine*

My improved record player comprises a frame which is indicated, in its entirety, by the reference character 16. It includes a pair of horizontal side members or beams 17 and 18, in parallel relationship to each other, which are U-shaped in cross section and which extend throughout the length of the frame 16. The beams 17 and 18 are spaced apart by a lower base plate 19 (Fig. 4) and an upper plate 21. Plate 19 is rigidly attached, in any suitable manner, to the lower side of the beams 17 and 18 and extends from a region approximately midway of the frame to the left end thereof. At the left, plate 19 extends upward to the top of beams 17 and 18, thence to the right over itself, and terminates in a flange 22 the ends of which overlie the respective ends of said beams to which the flange is rigidly secured. The plate 21 extends from a region centrally of the frame 16 over the tops of members 17 and 18, to which said plate is rigidly fastened, and to the right hand end of the beams. The ends of beams 17 and 18, at the right thereof, are additionally secured to each other by a transverse beam 23 which is U-shaped in cross section.

The magazine 3 is provided by plate 21 on which records deposited in the magazine are supported, resting on their flat sides. The records are confined to a region centrally of the plate 21 by a fence or confining wall 24 having flange portions 26 extending outwardly from the base and rigidly secured to the plate 21 in any convenient manner. The wall 24 includes a pair of side wall portions 27 and, to the right thereof (Fig. 4) a rear wall portion 28 each of which is inclined outward so that thereby the records are guided toward a region centrally of the plate 21 if they first strike one of the wall portions before they come to rest in the magazine. The magazine 3, at the left thereof, is provided with a vertical wall member 29 which may be bolted or otherwise fixed to ears 31 extending toward each other from the wall portions 27. The wall member 29 may include flanges 32 at its top and bottom edges to add rigidity to said member.

Figure 6:
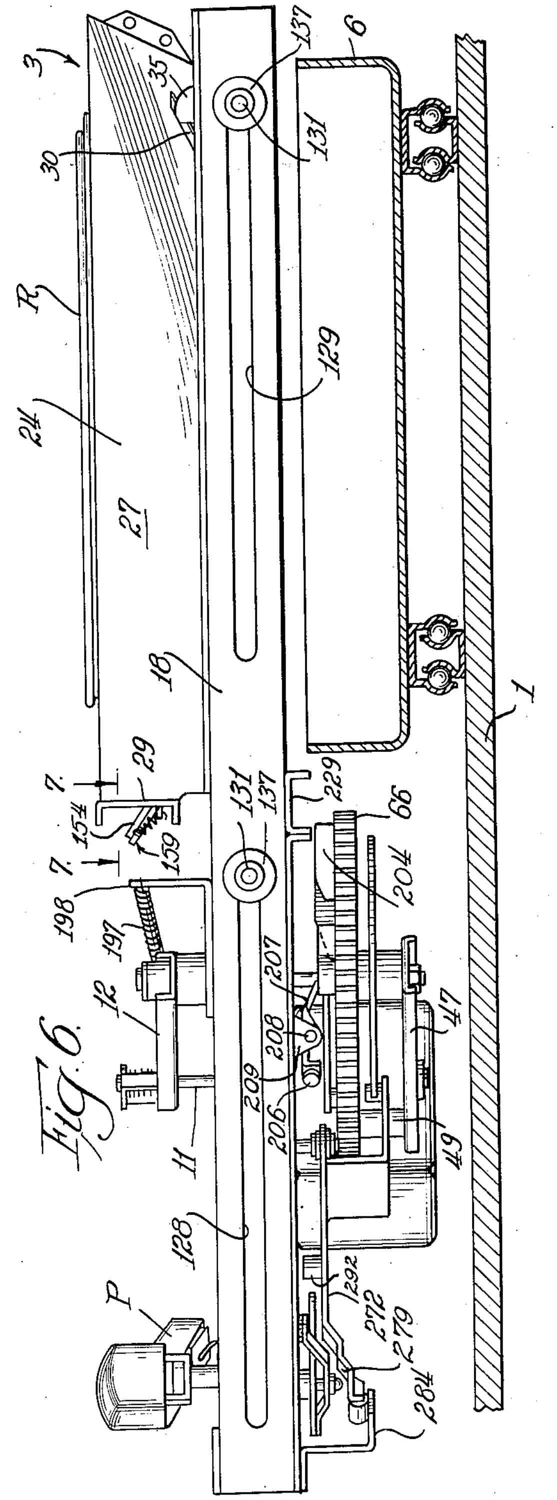
Fig. 6 is a side elevational view of the mechanism shown in Fig. 3, drawn to an enlarged scale.

The bottom record in the magazine 3 is segregated from the remaining records by operation of a pair of fingers 33 and 35 projecting upward through a pair of slots 34 in the plate 21. The slots 34 are parallel to each other an equidistance from the vertical medial plane, referred to previously. The end wall 28 is also provided with openings 30 through which the fingers 33 and 35 may pass (Fig. 6). Between the slots 34 the base plate 21 is offset at 36 thereby providing a pad 37. The bottom of member 29 is spaced from the top surface of the pad 37 by the thickness of a phonograph record as is later described. The fingers 33 and 35 at the right hand end of the slots 34 are thus enabled to move to the opposite ends of the slots, and in so doing engage the periphery of the bottom record in the magazine and slide it out from under the remaining records, the bottom record passing under member 29 while the records thereabove are retained in the magazine by that member. This operation takes place after a record on the turntable has been reproduced or its reproduction interrupted. Both of the fingers 33 and 35 are concurrently carried longitudinally of the slots by mechanism later to be described. Because of the symmetrical relationship of the fingers 33 and 35 to the longitudinal centerline of the changer, if the bottom record is lying nearer to one side of the magazine than the other, one of the fingers will engage the bottom record and move it into engagement with the other. When engaged by both fingers, the record's axis will be in the vertical medial plane previously alluded to, and the record may then be carried outward of the magazine to complete the ejection therefrom.

It is a well known fact that records are sometimes warped or bowed slightly in transverse section. Therefore, the pad 37 is provided to afford support for the bottom record at a region centrally thereof. This is a safety measure to assure operative engagement of a bottom record by both of the fingers, at least one of which could conceivably pass beneath the bottom record were the bottom record supported at its peripheral regions by a uniformly flat plate.

*Support and drive for turntable*

Figure 10:
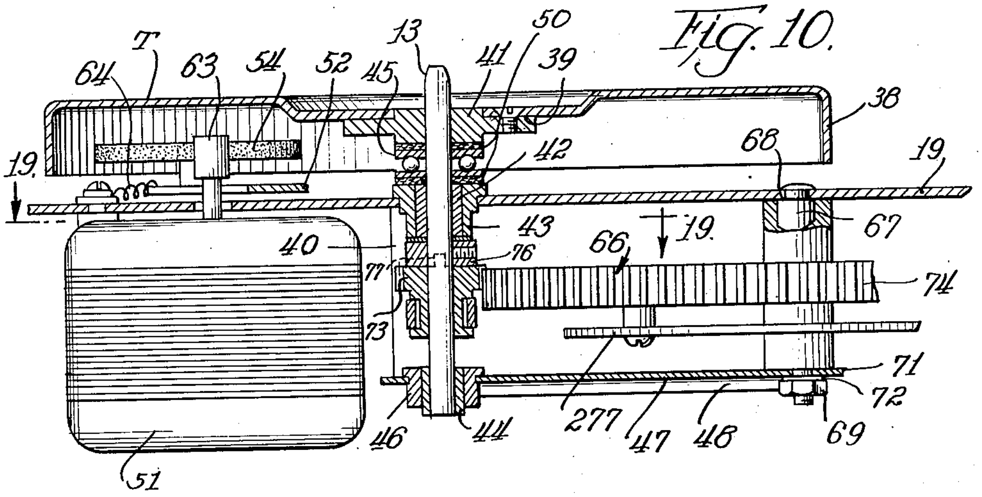
Fig. 10 is a vertical sectional view on line 10—10 of Fig. 9.
Figure 11:
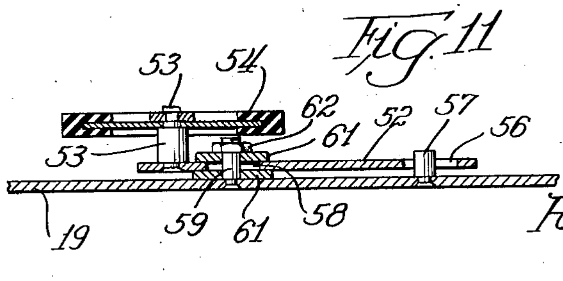
Fig. 11 is a vertical sectional view on line 11—11 of Fig. 9.

The turntable T is a conventional in general construction having a depending flange 38 at is periphery (Fig. 10). The turnable T is bolted to a flange 39 of a hub 41 which, in turn, is rigidly mounted on the spindle 13. For its support, the spindle is journalled in a bushing 42 within an upper bearing 43 carried by the plate 19. The lower end of spindle 13 is journalled in a bushing 44 contained in a lower bearing 46 which, in turn, is supported by a bracket 47. The bracket 47 is triangular in formation (Fig. 14) having flanges 48 (Fig. 10) which are flared downward from the two sides which converge from the base of the triangle in the proximity of the spindle. The bracket is bolted to plate 21 at its base by posts 49 on either side of said spindle and is spaced properly therefrom by bushings 40. The weight of the turntable is carried by a conventional ball thrust bearing 45 sandwiched between washers 50 of some suitable vibration insulation material, one of the washers resting on the bearing 43 and the other washer being against the hub 41.

The turntable T is adapted to derive motion from a motor 51, frictionally driving the turntable through the flange 38. It will be recognized that any convenient friction drive including a multi-speed unit may be used. In the embodiment illustrated, however, the motor 51 is supported with its axis perpendicular to plate 19, in any suitable manner at a point below the turntable T. On the upper side of plate 19 is supported a mobile link 52. It carries, at one end thereof, a stud 53 extending upward for rotatable support of an idler 54 having a peripheral surface of some resilient material such as rubber. The opposite end of link 52 is apertured by a slot 56 adapted to accommodate another stud 57 which is supported from plate 19. Link 52 is therefore adapted to have movement longitudinally thereof within the limits afforded by slot 56 and pin 57. In order to provide support and still allow lateral motions of the link 52, a pin 59 rigidly secured to the plate 19 extends through an aperture 58 in the link. A pair of washers 61 on the pin 59, one on either side of the link 52 retain the link in its proper vertical position. The washers 61 are retained on the pin 59 by a nut 62. The washers 61 being of greater diameter than the diameter of hole 58, anchor the link 52 to the plate 19 yet permit the link to be moved laterally and longitudinally within the limits thus provided. The idler is biased into frictional driving engagement with the turntable flange 38, and concurrently with a driven pulley 63 on the motor 51, by a tension spring 64 which is anchored between the link 52 and plate 19.

*Intermittently operated drive mechanism and control therefor*

Intermittently operated drive mechanism is provided for operation of the magazine fingers 33 and 35 and pickup arm P when a record is rejected; that is, when reproduction of the record has been completed, or its reproduction interrupted at any time before it is completely reproduced. On operation of this drive mechanism the pickup arm P is manipulated through a cycle of motion during which a record is removed from the turntable and another record transferred thereto in sequence. The drive mechanism includes a cam-gear or cam wheel represented in its entirety by the reference character 66 (Fig. 10) which is journalled on an immovable vertical shaft 67 extending between one end of the bracket 47 and the plate 19. By reductions in diameter of both of its ends, the upper end of shaft 67 is provided with a shoulder 68 against which plate 19 is secured, the shaft passing therethrough and being upset at the extremity thereof. The lower end of shaft 67 passes through bracket 47 and and a nut 69 threaded thereon is employed to draw a second shoulder 71 against the bracket, a lock washer 72 being employed to resist removal of the nut.

Figures 12, 13, 14, 15, 16:
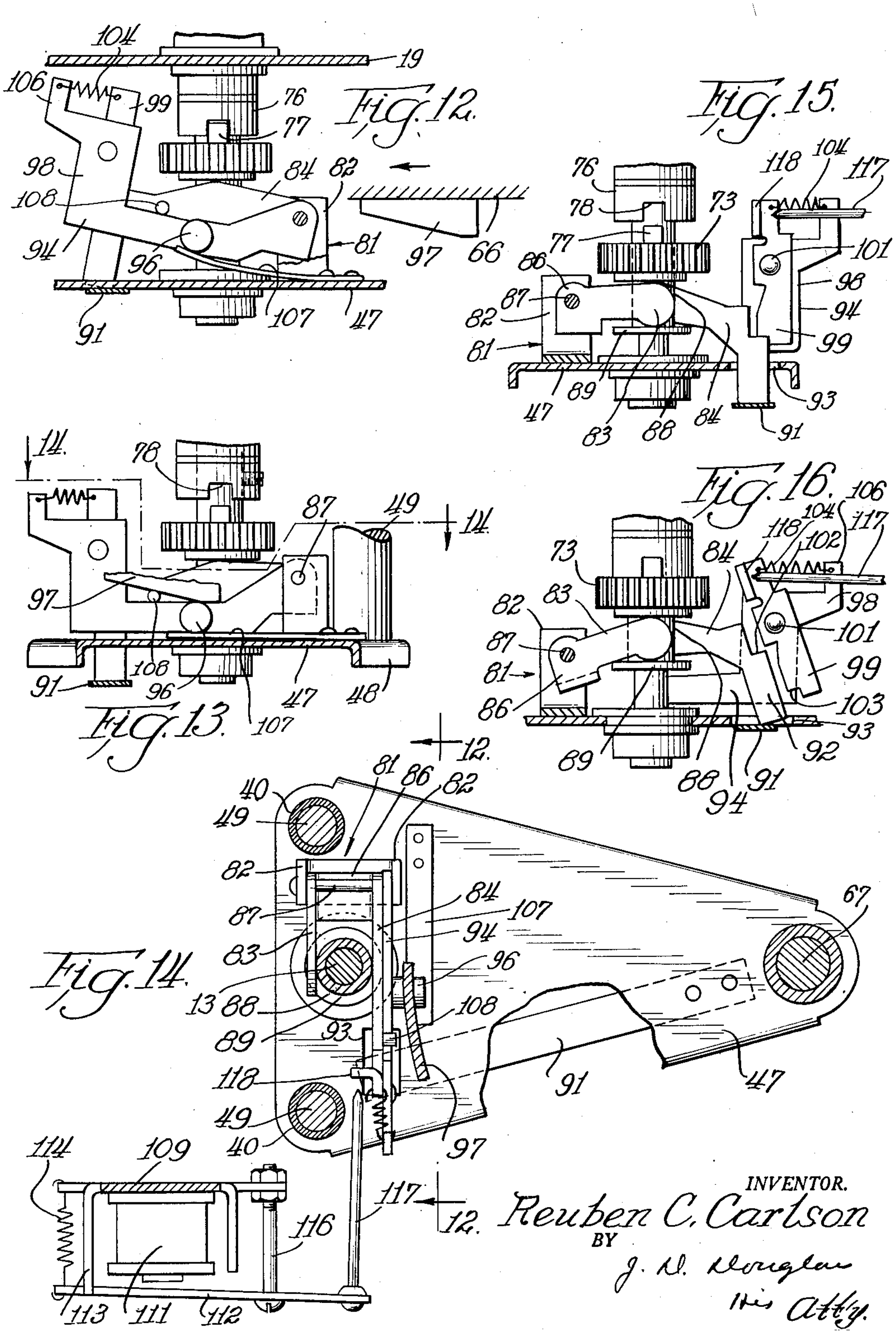
Fig. 12 is a fragmentary vertical sectional view taken on line 12—12 of Fig. 14 showing the clutch in side elevation and in closed position, associated parts being broken away.
Fig. 13 is a fragmentary elevational view similar to Fig. 12 but showing the clutch in open position.
Fig. 14 is a horizontal sectional view taken on line 14—14 of Fig. 13.
Fig. 15 is a view corresponding to Fig. 13, showing the opposite side of the clutch.
Fig. 16 is a view of the clutch mechanism showing the side depicted in Fig. 15, some of the parts being in a different position.

The intermittently operated drive mechanism also includes a pinion 73 which is slidably disposed on the spindle 13, and is constantly in mesh with a gear 74 at the periphery of the cam wheel 66. When a record is being reproduced, the pinion 73 is in the lower of its two positions (Fig. 13). In this position, pinion 73 is out of engagement with a drive member 76 which is fixed to the spindle 13. The pinion 73 is adapted to be slid upwardly, however, by mechanism later to be described, and into cooperative engagement with the drive member 76. The pinion 73 has a pair of lugs 77 extending from the upper end thereof while driver member 76 has recesses 78 (Figs. 12 and 13) in the lower end thereof adapted to receive the lugs 77, thus providing the driving engagement therebetween.

The operation of closing the clutch by sliding pinion 73 into driving engagement with driver 76 is effected by spring pressure released by a latch mechanism which is unlatched by energization of a remotely controlled electromagnet. Although other forms of latch mechanism may be adapted to release the spring pressure for shifting of pinion 73, a suitable one is shown in Figs. 12 to 16 inclusive. It includes a U-shaped member 81, rigidly fastened to the bracket 47, having arms 82 extending upward and embracing a pair of parallel arms 83 and 84 of a shift yoke 86. The yoke 86 is pivotally mounted on the U-shaped member by a pin 87 passing through its two arms 82 and through the arms 83 and 84 of the yoke 86, at the ends thereof. The arms 83 and 84 extend into an annular groove 88 about an extension 89 of the pinion 73. Whenever the yoke 86 is swung about the pin 87, the pinion 73 is moved axially of spindle 13. The pinion 73 is biased toward its closed position by the pressure of a leaf spring 91 on a lateral extension 92 of the yoke arm 84. The spring 91 is anchored at one end thereof to the lower side of bracket 47 and extends beneath an aperture 93 through which the extension 92 projects. During changing of records, commonly referred to as "in cycle," the pinion 73 is drivingly coupled to the driver 76 (Fig. 9), as previously indicated. It is therefore necessary that yoke member 86 be swung downward, against the resistance of spring 91, to interrupt motion of pinion 73 at the end of a record changing cycle.

For this operation, a latch lever 94 is swingably anchored, at one end, to the pin 87 while its opposite end is in latched association, by means later to be described, with the yoke 86. Consequently, latch lever 94 is normally adapted to swing with the yoke 86 about pin 87. The lever 94 carries a follower 96 which extends laterally thereof and is adapted to be engaged by a depending cam 97 on the lower side of cam wheel 66. Wheel 66 is in cycle during the course of one complete revolution after which it stops as the cam 97 depresses the lever 94 and thus the yoke 84 to disengage pinion lugs 77 from the recesses 78 of the driver member (Fig. 13). This is the position in which the pinion remains during reproduction of a record.

In order that the clutch may be closed to initiate a cycle, as when reproduction of a record is discontinued, the latch lever 94 has an arm portion 98 extending upwardly. This arm bears a latch dog 99, (Fig. 15) pivoted at 101 to the arm portion 98 of the member 94 and adapted to cooperate with the yoke arms 84. The arm 84 of the yoke member is notched to provide a shoulder (Fig. 16) with which an abutment surface 103, formed by notching the lower end of dog 99, is normally engaged to retain the yoke in latched relationship with the latch lever 94. This engagement is maintained by the biasing force of a tension spring 104 anchored between the upper end of dog 99 and an ear 106 on the arm portion 98. Thus the arm 84 is held downward with respect to the latch lever 94. Movement between the arm 84 and lever 94 is further prevented by a pin 108 fixed in the arm 84 and extending over the lever 94 but not into the path of the cam 97. A leaf spring 107 fixed to the bracket 47 engages the follower 96 to urge the latched assembly upwards against the cam 97 which, as stated, normally presses the assembly downward against the spring 107 to the position shown in Figs. 13 and 15. During the change cycle, however, the spring 107 is free to urge the lever 94 upward, and because of the engagement of that lever with the pin 108, the arm 84 is also held upward by the spring 107 supplementing the biasing action of the spring 91 as shown in Fig. 12.

As was previously indicated, electromagnetic means is employed to start the record changing cycle. This means is attached to the lower side of plate 19 by a yoke 109 riveted or screwed to the plate 19 for support of an electromagnet 111. Associated with the magnet 111 is an armature 112 which is adapted to pivot about one end of an arm 113 of the yoke 109, the armature being biased clockwise (Figs. 14 and 19) about its fulcrum by a tension spring 114 but limited in its movement away from the magnet by a tie rod 116, supported by yoke 109, over which the armature is adapted to move freely toward magnet 111. The armature bears, in extension laterally of its swingable end, an actuator rod 117. The free end of this rod extends toward an ear 118 protruding laterally from the upper end of dog 99, and in the normal position (Fig. 15) is in spaced relationship thereto. On energization of the magnet 111, the armature 112 is attracted by the magnet 111, carrying the rod 117 into engagement with the ear 118, rotating the dog 99 counterclockwise from holding engagement with arm 84 (Fig. 15) to an unlatched condition (Fig. 16). As this operation takes place the leaf spring 91 moves the yoke member 86 upward thus carrying the pinion 73 into driving communication with the driver 76. The operation of the electromagnet need be only momentary, however, since only a small increment of rotation of the wheel 66 is necessary to carry cam 97 out of engagement with the follower 96 whereupon the latch lever 94 is pressed upwardly by spring 107. This is accompanied by elevation of the dog 99 so that it will re-engage the arm portion 92 as the mechanism again assumes the position in which it is indicated in Fig. 12 until the cyclic motion of cam 97 has been completed.

*Magazine ejector*

Figure 4:
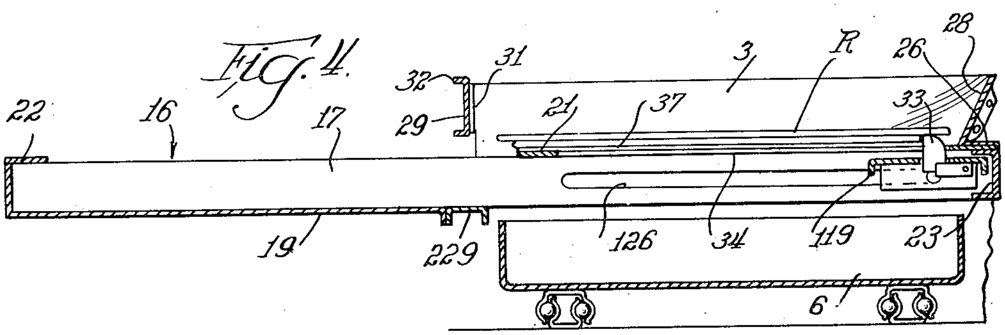
Fig. 4 is a vertical sectional view taken on line 4—4 of Fig. 3.
Figure 5:
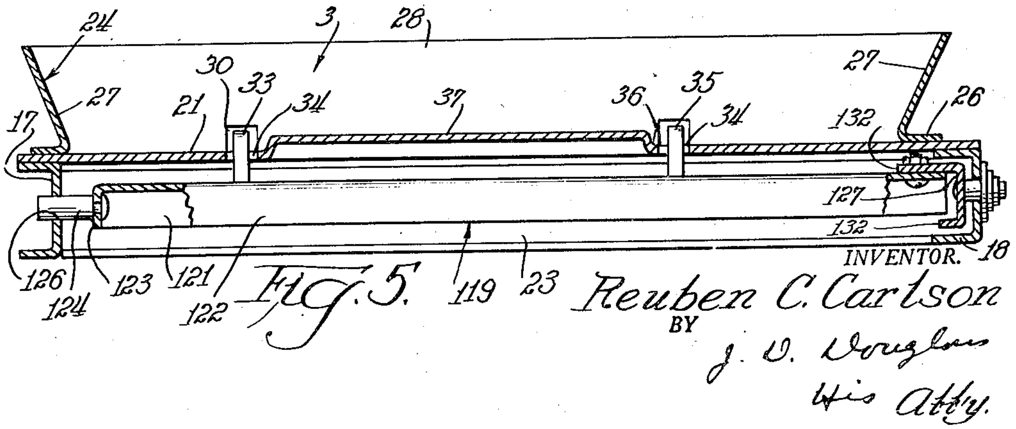
Fig. 5 is a vertical sectional view taken on line 5—5 of Fig. 3.

As was previously indicated, the bottom record of a group in the magazine 3 is removed therefrom, partly by the movement of the fingers 33 and 35 (Fig. 3) and partly by the motion of the vertical pin 11. The fingers 33 and 35 are anchored to a carrier beam 119 (Fig. 5) which extends transversely of the frame 16 and which is adapted to be moved longitudinally thereof by mechanism to be described hereinafter. In detail, the beam 119 is constructed preferably of sheet metal having downwardly flared edges or flanges 121 and 122 for the sake of rigidity. An end flange 123 is also provided on which is rigidly mounted a guide stud 124 adapted to be received by a slot 126 extending longitudinally of the side member 17 (Fig. 4). The opposite end of beam 119 is rigidly connected, in any suitable manner (Fig. 17), to a mobile guide beam 127 which is U-shaped in transverse vertical section and which is embraced by the side member 18 (Fig. 5). The beam 127 is slidably anchored to the side member 18 from which it is spaced slightly as follows: Side member 18 is apertured, longitudinally thereof, by a pair of slots 128 and 129 (Fig. 6) in each of which is received a stud 131 which is rigidly connected to the mobile beam 127, said beam being thereby restrained against forces tending to displace it vertically. The flanges 132 on the beam 127 provide support for a vertical pin 133, at each end of said flanges, each of the pins providing bearing support for an antifriction roller 134. Beam 127 is notched to provide apertures 136 through which the rollers 134 extend into engagement with side member 18. The rollers are retained against the member 18 by washers 137 disposed on the studs 131 outside the member 18.

Figure 17:
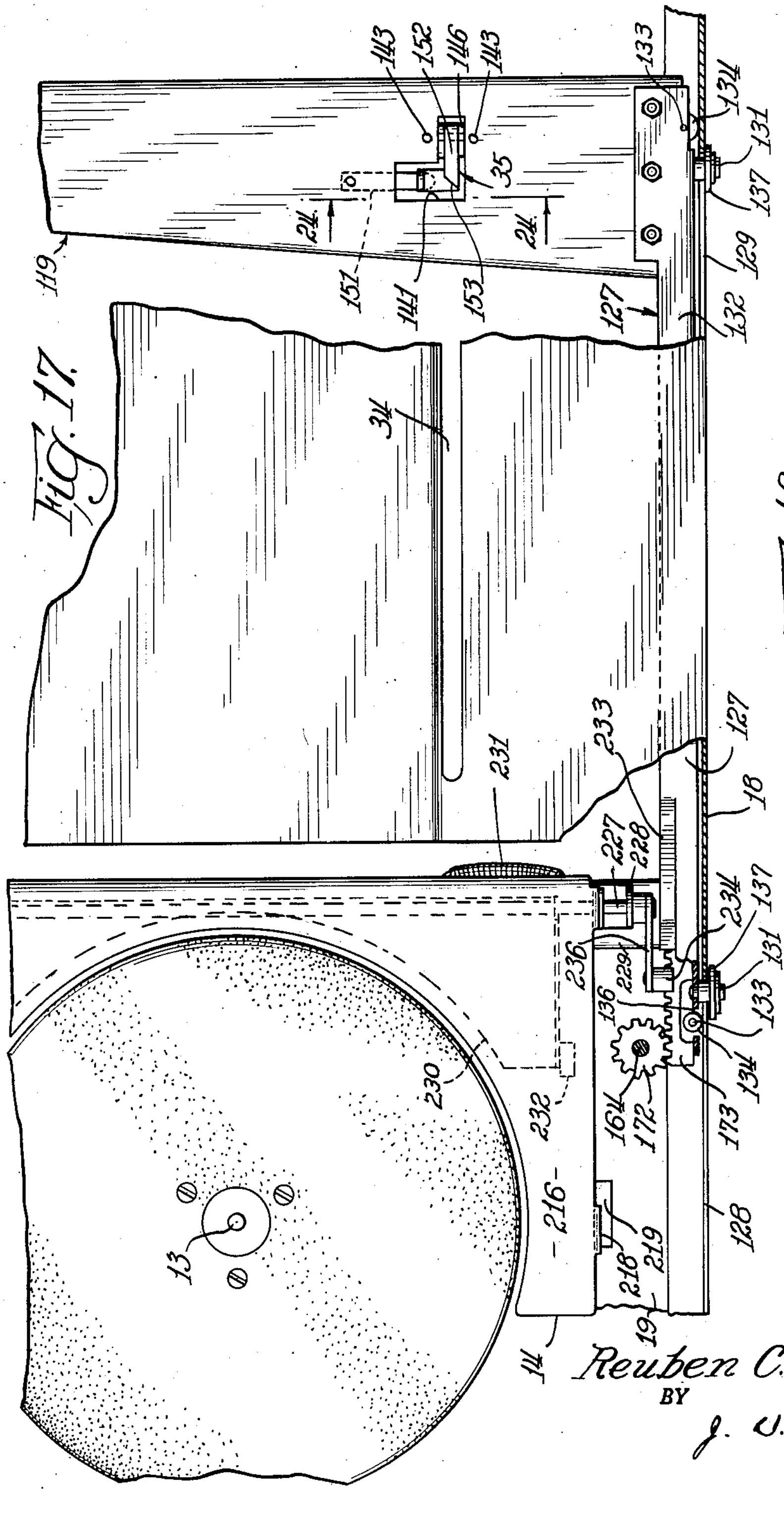
Fig. 17 is a fragmentary top plan view of the turntable and portion of magazine along with part of the ejector mechanism.
Figures 24, 25:
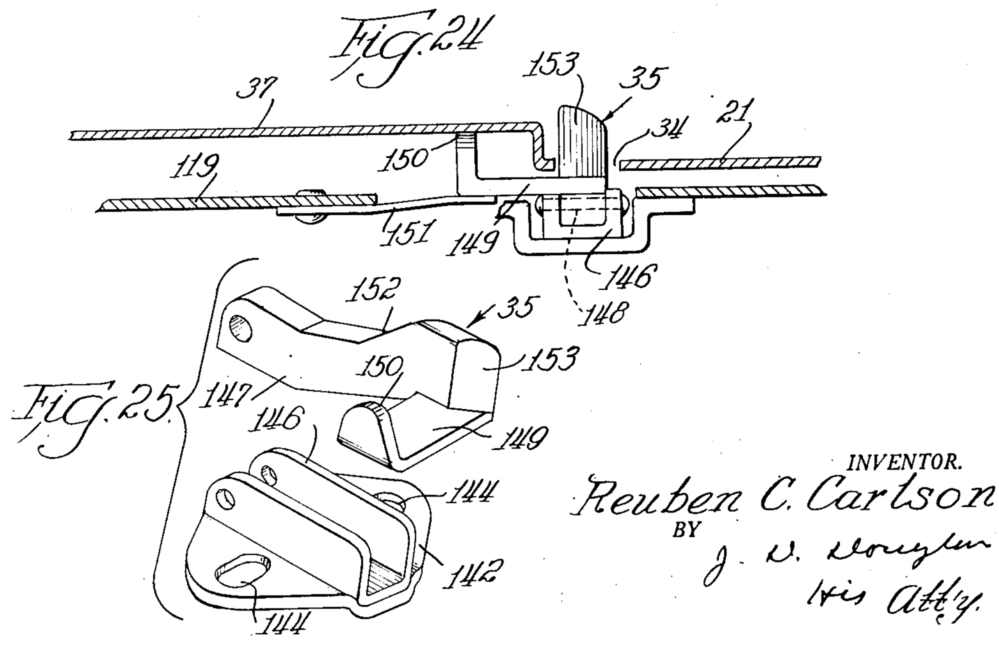
Fig. 24 is a vertical sectional view drawn to an enlarged scale, taken on line 24—24 of Fig. 17.
Fig. 25 is an exploded view of details of the magazine ejector mechanism, in perspective and drawn to an enlarged scale.

The fingers 33 and 35 are pivotally bracketed to the carrier beam 119 as best shown in Figs. 17, 24 and 25. It will be noted that the surface of beam 119 is apertured at points below the respective slots 34 and 30 by a pair of L-shaped slots 141. Below each of the slots 141 a channeled bracket 142 (Fig. 25) is fastened to the beam 119 by screws 143 which pass through slots 144 in the bracket to provide for adjustment thereof laterally of said beam, and consequently slight adjustment of fingers 33 and 35 transversely of the slots 34 and 30, as will be apparent. Each of the brackets bears, in rigid connection therewith, a U-shaped channel member 146 which is adapted to embrace shank portions 147 of either of the fingers 33 or 35. Each of the shank portions, in turn is pivoted, at one end thereof, to a bracket 146 by a pin 148. Each of the swingable ends of the fingers 33 and 35 include stop portions 149 which extend laterally therefrom, thence upwardly and terminate in contactor ends 150 adapted to be pressed normally against the lower side of pad 37 by a leaf spring 151, one end of which is fastened to the beam 119. While the fingers 33 and 35 normally extend above the level of pad 37 just high enough to engage the bottom record of the magazine 3 on their forward stroke; that is, their right to left movement (Fig. 4), they will be depressed against the resistance of springs 151 on their return stroke. This is effected by the weight of the records in the magazine. To facilitate their backward movement, the fingers have a sloping surface 152 so that the edge of the record or records they engage will deflect the fingers downward without undue interference with their movement under the stack. The swingable ends of fingers 33 and 35 are provided with ejector surfaces or record cam surfaces 153 slanted inwardly at equal angles so as to approach tangency to the records in the magazine. Either of the surfaces 153 is thus adapted to deflect the bottom record into concurrent engagement with both of the deflector surfaces.

Figure 7:
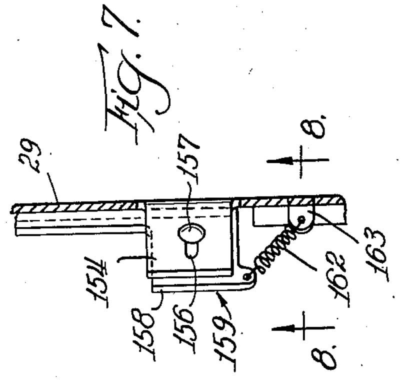
Fig. 7 is a fragmentary transverse sectional view taken on line 7—7 of Fig. 6, drawn to a still larger scale.
Figure 8:
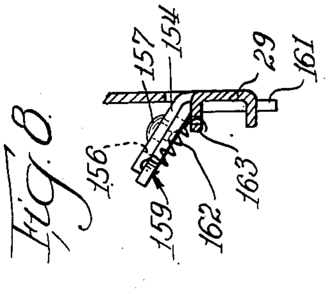
Fig. 8 is a vertical sectional view on line 8—8 of Fig. 7.

A safety gate means, best shown in Figs. 6, 7 and 8, is provided at that region of magazine 3 through which each of the records is ejected. Said gate means includes a pair of ears 154, struck outwardly from the side of the magazine's vertical wall member 29, and which slant upwardly at an angle of approximately 60 degrees from the side of said wall member. Each of the ears 154 is apertured by a slot 156 which is adapted to accommodate therein a stud 157 carried by each one of a pair of ears 158 on a gate member 159. The gate member 159 is bent longitudinally to provide a vertical stop wall 161 biased into engagement with the wall member 29 by a pair of tension springs 162, each of which is anchored to one of the ears 158 and an ear 163 on the member 29. Although the bottom of wall 29 is in a horizontal plane spaced from the horizontal plane of the top of pad 37 by approximately twice the thickness of a record, the lower edge of the stop wall 161 is normally maintained at a horizontal plane which is spaced from the horizontal plane of the top of pad 37 by a distance but slightly more than the thickness of one phonograph record. Thus, a normal record could be slid from the magazine without engaging the stop wall 161 while the second record would be prevented from sliding by either the member 29 or the stop wall 161. However, a record, warped badly enough to engage the stop wall 161 during its ejection from the magazine, would merely cause displacement of the gate member upward, guided by the slots 156 and studs 157 and against the resistance of springs 162, until said warped record could pass under the member 159. The springs 162 after passage of the record would then return gate member 159 to its normal position.

Figure 18:
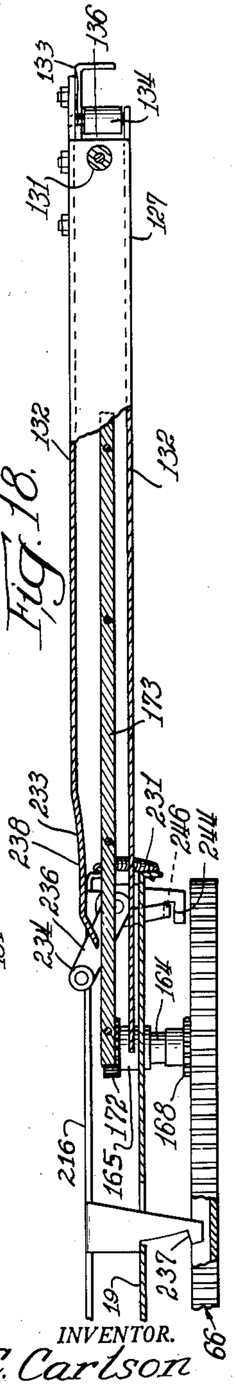
Fig. 18 is a fragmentary side elevational view of the mechanism shown in Fig. 17, the same being broken away to reveal the structure of underlying parts.

As has already been explained, the fingers 33, 35, carrier beam 119 and mobile beam 127 are coupled to move together longitudinally of the frame 16. Their movement is derived from the cyclical movement of cam wheel 66. The means whereby the rotary motion of wheel 66 is translated into reciprocatory motion of mobile beam 127 includes a vertical shaft 164 (Figs. 3 and 17) journalled in a bearing 166 which is supported from the side member 18 by a bearing plate 167 fixed to the top flange of said side member. The shaft 164 is also rotatably supported from the plate 19 by suitable bearing means 165. At its lower end, shaft 164 carries a pinion 168 (Figs. 18 and 19) adapted to mesh alternately with an internal gear segment 169 or an external gear segment 171 formed on the upper surface of cam wheel 66. The ends of each segment are spaced from the ends of the other segment by spaces adequate to accommodate the pinion 168 free from engagement with either of the segments. The shaft 164 also carries a second pinion 172 (Figs. 17 and 18) which is at a level above pinion 168 so as to be constantly in mesh with a rack 173 rigidly secured to the mobile beam 127. When the wheel 66 starts a rotary cycle, the external gear segment 171 first engages the pinion 168 with which it remains in mesh until the fingers 33, and 35, have been carried to their extreme position at the left of the magazine. Segment 171 (Fig. 19) having been carried out of engagement with the pinion, the fingers 33 and 35 stop. Then, due to the continuing motion of cam wheel 66, the annular segment 169 is carried into engagement with the pinion 168. When pinion 168 meshes with segment 169, it is rotated in a direction counter to the rotation imparted to it by segment 171, thus providing return motion for the fingers 33 and 35. The motion is discontinued when segment 169 has been carried out of engagement with pinion 168, at which time the fingers are returned to their normal position, since the pinion is disengaged from both of the segments and the cam wheel 66 is stopped in this position. The stroke of the fingers 33 and 35 provided by these means moves the bottom record only sufficiently for its center hole to be disposed outside the magazine, and further means are required to complete the transfer of the record to the turntable T.

*Record transfer mechanism*

As was previously indicated, the center hole of the bottom record of a group of records in the magazine 3 is adapted to be engaged by a pin or finger 11 to provide for transfer of said bottom record to the turntable T. The arm 12 must, therefore, move vertically as well as horizontally. In order that it may do so, the arm 12 is rigidly coupled to a hub 174 (Fig. 20) which is, in turn, rigidly connected to the upper end of a vertical shaft 176. Shaft 176 is journalled for axial and rotative motion in a sleeve 177 which is carried by the bearing plate 167 and extends downward through the plate 19 to which it is also secured. If desired, the hub 174 may be attached to the shaft 176 by set screws 178 to allow adjustment thereof axially of the shaft. The arm 12 is biased upwardly by a compression spring 179 coiled about the shaft 176 within an annular recess 181 in the hub 174. The spring is thus engaged between the plate 167 and the top 182 of the recess 181. The hub 174 includes a pair of diametrically opposite arms 183 continuing downward from the peripheral wall of said hub and which terminate in fingers 184 extending radially from the axis of said hub. The bearing plate 167 has a pair of similarly shaped arcuate apertures 186 disposed opposite each other about the axis of shaft 176. As arm 12 is moved toward its lower extreme position, by means later to be described, the fingers 184 are adapted to pass through the apertures 186. Then as shaft 12 is swung counterclockwise, also by mechanism later to be described, the fingers are carried under edges 185 of plate 167 partly defining the apertures 186. The fingers 184 remain under plate 167 during record reproduction to retain the arm 12 in its lower position against the resistance of spring 179. In order that this locking operation may take place effectively, the apertures include neck portions 187 through which the arms 183 are adapted to extend, said portions being defined by regions 188 of plate 167, beneath which the fingers 184 may extend.

Figures 21, 22, 29:
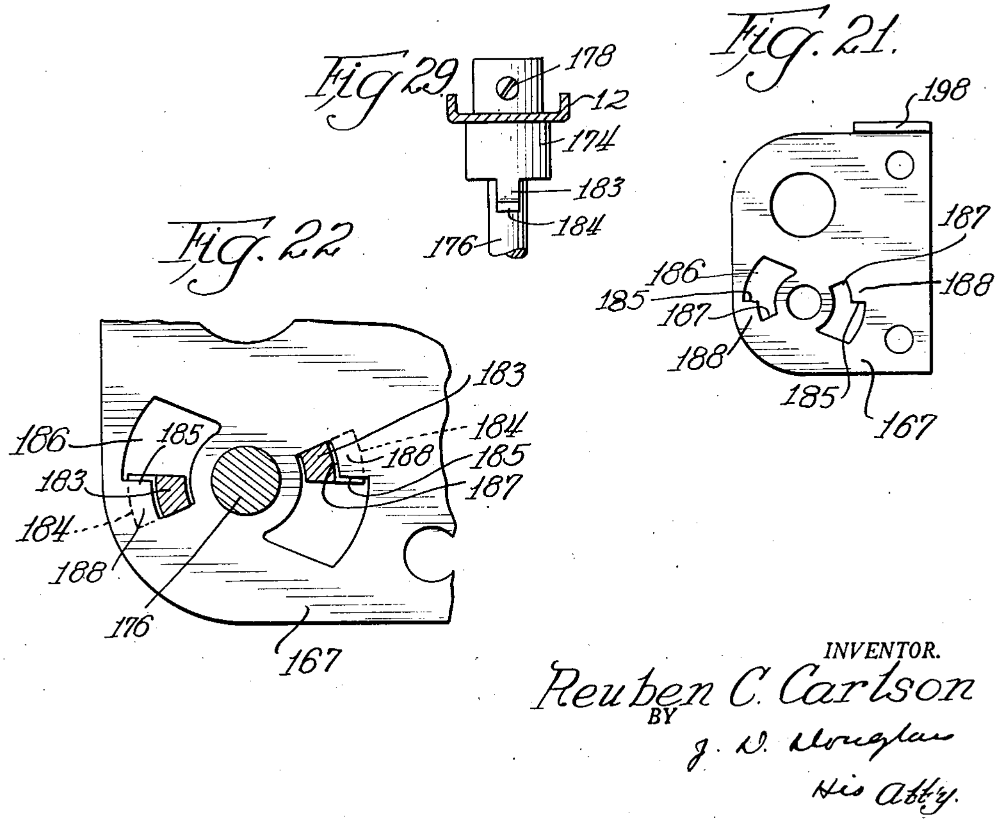
Fig. 21 is a top plan view of one of the details of the latch mechanism shown, sectionally in Fig. 20.
Fig. 22 is a fragmentary top plan view of another detail of the latch mechanism shown sectionally in Fig. 20.
Fig. 29 is a vertical sectional view taken on line 29—29 of Fig. 20.

For release of the hub 174 from retention by the plate 167, shaft 176 bears a follower arm 189 (Figs. 19 and 20) extending laterally from the lower end of the shaft and over the cam wheel 66. The swingable end of arm 189 bears a follower 191 extending downward into a cam slot 192 defined by a vertical inner wall 193 of the gear segment 171 and a vertical peripheral wall 194 of a segmental pad 196 on the cam wheel 66. The walls 193 and 194 are arcuate of the axis of wheel 66 and are adapted to confine the pin 11 to a position in which it is coaxial with the spindle 13. The swingable arm 12 is biased, clockwise (Fig. 3), by a tension spring 197 which is anchored between the arm and a lug 198 extending upward from the bearing plate 167. Therefore, when the cam wheel 66 (Fig. 19) starts on its cycle of operation turning counterclockwise, slot 192 is carried out of confining cooperation with the follower 191 whereupon spring 197 quickly swings the arm 12 and the follower arm 189 clockwise. During this operation the fingers 184 (Fig. 22) on the hub 174 are moved out from under the regions 188 of plate 167 whereupon the compression spring 179 moves the shaft 176 and arm 12 upward. Preferably, a buffer member 199 (Fig. 3), of some resilient material such as rubber, is attached to the wall member 29 to absorb the impact of arm 12 and against which the arm may remain during part of a cycle of the wheel 66.

While the swingable arm 12 is at rest against the buffer 199, the axis of pin 11 is in the vertical medial plane in which the axis of the bottom record is moved by the fingers 33 and 35. The pin 11 is operatively supported by being slidably journalled in bushings 200 in the arm 12 (Fig. 20) and in the middle of a loop or U-shaped bracket 201, the two ends of which are bolted to the swingable arm. In order to bias pin 11 downward, a compression spring 202 is coiled thereabout between the top of loop 201 and a washer 203 engaging a flange 205 on the pin, elongation of spring 202 being limited by engagement of flange 205 with the bushing 200 in the arm 12. When so disposed, the lower end of pin 11 is at a level high enough to permit a phonograph record to be moved under it as the record is moved past the gate member 159. Concurrently with ejection of a record from the magazine, the arm 12 is lowered, by means later to be described. This lowering operation is so timed that the pin 11 is carried into engagement with the record preferably at a point on the record between the end of its sound groove and its center hole. Further lowering of arm 12 after this status of engagement compresses spring 202 so that the pin 11 may snap into the center hole of the record as the record is moved into alignment therewith. At this point, the ejecting motion of fingers 33 and 35 ceases.

In order that the arm 12 may be lowered from its raised position in which it is associated with the buffer 199, wheel 66 has a lift cam 204 (Figs. 6 and 19) formed on its upper surface. This cam 204 is formed as a rim adjacent the periphery of the cam wheel and is adapted to engage a follower 206 carried at one end of a lever 207. The lever 207 is pivoted on a pin 208 which is supported by a pair of ears 209 (Fig. 20) struck downward from the plate 19.

The end 210 of the lever opposite the follower 206 is bifurcated and is adapted to straddle the shaft 176 and have engagement with arm 189. The cam 204 is so located on the wheel 66 that at a point when the fingers 33 and 35 have been carried from right to left for about two-thirds of the distance between their two extreme positions, it engages the follower 206 and the lever 207 is swung clockwise pulling the arm 12 downward against the resistance of spring 179 thereby providing for the downward movement of pin 11 into engagement with the record. In timed relationship to this step, follower 191 is engaged by a vertical, radial wall 211 (Fig. 19) on the pad 196 which swings arm 189 counterclockwise until the follower enters the groove 192. The record, moved by pin 11, is thus carried away from fingers 33 and 35 to a point where it is coaxial with the spindle 13.

Figure 23:
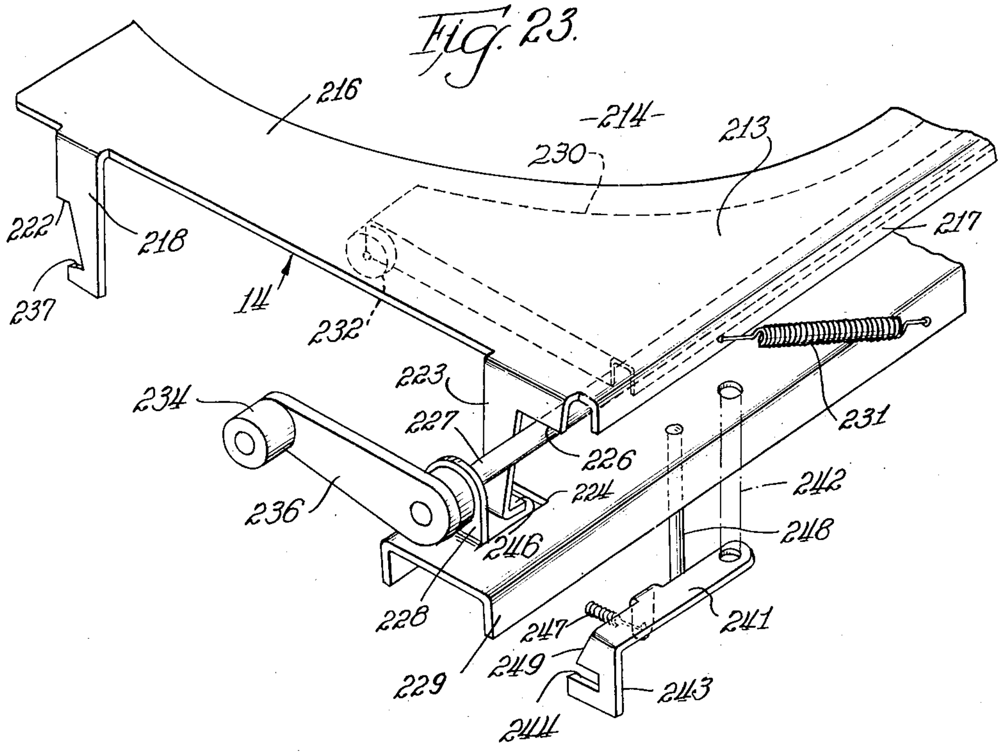
Fig. 23 is a fragmentary view of the elevator mechanism, in perspective, the view being partly diagrammatic.

While the record is being thus transported by the pin 11, it is supported by the record elevator or flap 14 (Fig. 23). This flap 14 is formed of sheet metal and has a flat top portion 213 which is cut away to form a recess 214, the edge thereof being an arc, the radius of which is slightly greater than the radius of the turntable T. A pair of arms 216 is thus formed extending around the edge of the turntable. Remote from the recess 214, the flap 14 includes a straight portion which is bent downward to provide a flange 217 to add rigidity to the flap. Normally, as when a record is being reproduced, the top of the flap 14 occupies a position below the level of the top of the turntable. In this position the flap is supported partly from the base plate 19 in spaced relationship thereto by a forward leg 218 which extends downward from the end of each of the arms 216, at the outside thereof.

The lower portions of the legs are of reduced width thereby providing shoulders 222 (Fig. 23) which are adapted to engage the top of plate 19 at the edges of a corresponding pair of apertures 219 in the plate 19 for support of the flap when it is in its lowermost position. Additionally, a rear leg 223 extends downward from either side of the flap at points removed from the legs 218. The lower portions of legs 223 are also of reduced width and extend through apertures 224 in a beam 229 fixed between members 17 and 18 transversely of the frame 16. Shoulders 226, formed as a flange on the flap 14 adjacent the legs 223, are adapted to rest on a horizontal crank shaft 227 journalled in an ear 228 struck upward from plate 19 at the respective apertures 224. A pair of spaced-apart tension springs 231 are anchored between the beam 229 and the flange 217 to bias the flanged side of the flap downward toward the base plate 19, the reason for which will presently be indicated. Between the respective arms 216 of flap 14 and the plate 19, rollers 232 are rotatably supported from either side of an intermediate member 230 which is carried by the shaft 227. Normally, the rollers 232 rest against plate 19. However, when the cam wheel 66 starts a cycle of motion a cam 233 at the left end of the mobile beam 127 (Figs. 17 and 19) strikes a follower 234 which is coupled to shaft 227 by a crank arm 236. The cam 233 extends through an irregular course to the level of the top of beam 127. Consequently, shaft 227 is rocked about its axis and the rollers 232 engage the flap arms 216 to lift them upward.

The flap arms are limited, in their upward movement, however, by hook portions 237 on the legs 218, said hook portions being adapted to engage the under surface of the plate 19. While in an early stage of its motion, the flap pauses at a stationary position in which it is in inclined relationship to the turntable. This pause occurs when a horizontal dwell portion 238, of the cam 233 rides under the follower 234. During the pause of the flap, the shoulders 226 remain in engagement with shaft 227 and the hook portions 237 engage the lower side of plate 19. If a record be present on the turntable at the time when the flap is moved to the position in which it pauses, that record it tilted upward and released from engagement with the spindle 13, by arms 216, and its center hole rethreaded over the pin 11. Immediately thereafter and still during the pause, the pin 11 is swung from its state of coaxial relationship with the spindle 13 to its position adjacent the side member 29 by force of spring 197. Because of the force of gravity and the inclination of flap 14, however, the record becomes disengaged from pin 11 after a short travel, but the momentum which the record has acquired is adequate to carry said record into the receiver 6.

As the beam 127 continues its motion, the dwell 238 is carried past the follower 234. The rollers 232 then elevate flap 14 against the resistance of springs 231 until the follower 234 is supported by the top of the beam 127 at which time the top of the flap is in the same horizontal plane as the top surface of pad 37. As the top of beam 127 is moved under follower 234, the arm 12 is lowered by the mechanism previously described so that pin 11 may enter the center hole of the record as it is ejected from the magazine. The subsequent movement of pin 11 then slides the record over the flap 14 until the center hole of the record is over the spindle 12, and the flap is then lowered as a result of the reverse movement of the beam 127, thus threading the record over the spindle.

As a safety device, to prevent premature upward movement of the flanged side of the flap 14, a latch arm 241 is pivoted at 242 to the beam 229. It is provided with a downwardly bent portion 243 which has a notch at 244 adapted to engage a finger 246 extended laterally of the flap leg 223. The arm 241 is biased about its pivot 242 in a direction toward the flap leg 223 by a spring 247 but is limited in its rotation by a stop pin 248 extending downward from the beam 229. As the flap leg 223 moves downward, the finger 246 engages a cam surface 249 on the edge of the finger 246 which moves the latch arm 241 against the resistance of the spring 247 until the notch 244 snaps over the finger 246 providing a latched status which prevails during record playing and the ejecting of a record from the turntable.

In order that the notch 244 may be unlatched from the finger 246 at the proper time, a cam 251 (Fig. 19) is provided on the cam wheel 66. The cam is effective radially of the cam wheel and is adapted to engage the lower end of the portion 243 of the latch. The cam disengages the latch from the finger 246 long enough for the finger to be carried to a level above notch 244 by the roller 232, thus allowing proper transfer of a record from the magazine as described above.

*Pickup arm and manipulation thereof*

Figures 26, 28:
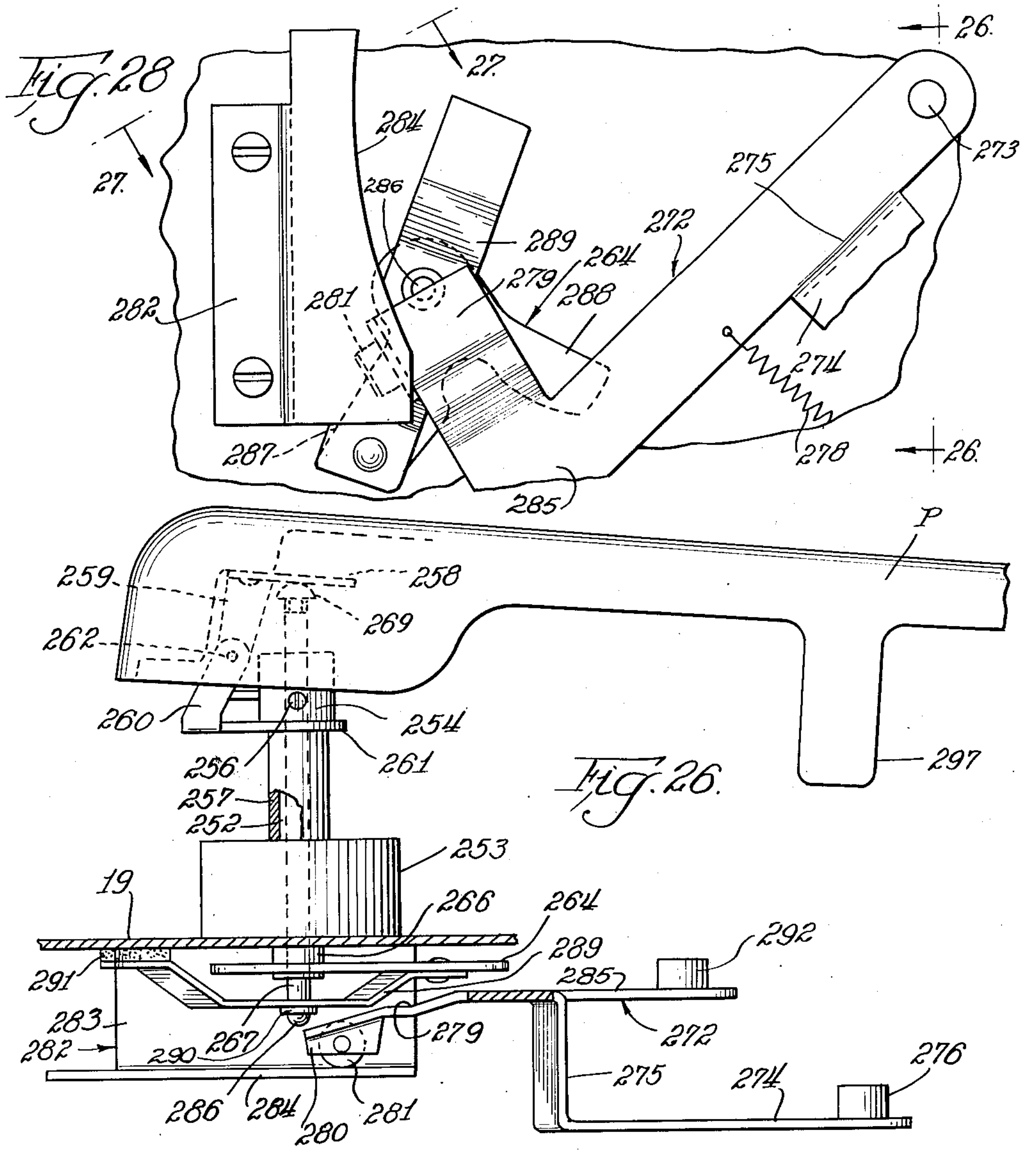
Fig. 26 is a view, partly in vertical section taken on line 26—26 of Fig. 28 and partly in side elevation of mechanism for controlling the position of the pickup arm.
Fig. 28 is a fragmentary bottom plan view of the mechanism shown in Figs. 26 and 27.
Figure 27:
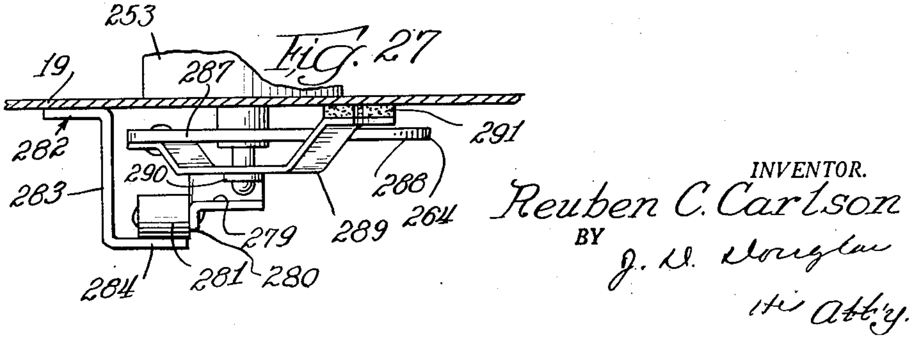
Fig. 27 is a fragmentary sectional view, taken on line 27—27 of Fig. 28.

The pickup arm P is supported from the plate 19 (Fig. 26). Means for the pickup arm's support includes a sleeve 252 journalled in a pedestal 253 which is rigidly mounted on the plate 19. Near its upper end, the sleeve 252 supports a collar 254 which may be fixed to the sleeve 252 by one or more set screws 256. Downward displacement of the sleeve is resisted by a tubular spacer 257 on the sleeve between pedestal 253 and collar 254. Vertical adjustment of the sleeve by loosening of the set screws 256 and sliding the collar 254 on the sleeve is thus made possible. In rigid relationship to the pickup arm P is a bracket 258 from either side of which an ear 259 extends downward. The collar 254 bears a bracket 261, extending laterally thereof from the end of which a pair of ears 260 extend upward embracing the ears 259. A pivot pin 262 extends through both pairs of ears providing a horizontal axis about which the pickup arm is adapted to be rocked.

The lower end of the sleeve 252 carries a positioning member 264 which resists upward displacement of sleeve 252 with respect to the pedestal because of its sliding engagement with an extending portion 266 of the pedestal 253. Additionally, a lift pin 267, slidably journalled in the sleeve 252, bears at its upper end a set screw 269 adapted to engage the bracket 258. The lift pin 267 extends below the lower end of sleeve 252 so that mechanism later to be described, is adapted to engage the pin for moving it vertically to rock the pickup arm about the pin 262.

The pickup arm P is adapted to be manipulated automatically, from the cam wheel. Vertical motion of the arm to raise it from the played record is provided by a cam lever 272 (Fig. 19) pivotally supported from the lower end of a vertical stud 273 on the base plate 19. The lever 272 includes a follower arm 274 which is offset at 275 so that the arm 274 may extend under the wheel 66. A follower 276 extends upwardly from the free end of the arm 274 and is biased into engagement with a cam 277 (Fig. 19), formed on the lower surface of the wheel 66, by a tension spring 278 anchored between the lever 272 and the plate 19. A cam section 279 (Fig. 26) adapted to be moved under the lift pin 267 is formed on a cross piece 285 of the lever 272.

At one end thereof, the section 279 bears, struck downwardly therefrom, an ear 280 which, in turn, carries a roller 281. During its movement about its pivotal axis, the lever 272 is supported against downward forces by a steadyrest or bracket 282 which is supported from the lower side of plate 19 beside the sleeve 252. The bracket 282 includes a vertical or offset portion 283 from the lower end of which a ledge or support portion 284 extends horizontally. The ledge 284 is at such an elevation that it is adapted to afford support for the roller 281 which, in turn, supports the lever 272 without substantially interfering with its movement.

The cam section 279 is carried beneath the lower extremity 286 of lift pin 267 to urge it upward and therefore to remove the pickup arm from the record it has been tracking, since engagement of lift pin 267 by cam 279 is accompanied by rocking of the pickup arm about its horizontal axis.

The pickup arm P is coupled to brake mechanism to resist undue movement of the pickup arm once it is freed by its upward movement, from the record it has been tracking. The brake mechanism includes the positioning member 264 which is generally V-shaped in contour, and is connected to the sleeve 252 at the junction of a pair of arms 287 and 286.

A leaf spring 289 is rigidly secured at the swingable end of arm 287. From its connection with arm 287 the spring 289 is slightly bowed downward so as to extend under sleeve 252 thence upwardly slightly terminating in a free end which, when a record is being reproduced, is in spaced relationship to the base plate 19. The lift pin 267 passes freely through an opening in the spring 289 and bears, below the spring, a flange 290 so that when said pin is lifted by the cam 279, the spring 289 is engaged by said flange, and the free end of the spring carried into frictional engagement with the lower side of plate 19. If desired, the upper surface of spring 289 may be surfaced with some element having a coefficient of friction materially higher than metal such as cork or fibrous material, as at 291 to increase the resistance to movement of the spring.

The motion of lever 272 also swings the pickup arm P about its vertical axis. In order that this may be carried out, the upper side of that end of arm portion 285 which is remote from cam 279 carries a follower 292. It is adapted to be carried into engagement with a cam surface 293 (Fig. 19) on the edge of arm 287, over which the follower slides to swing the pickup arm P away from the axis of the turntable. In the course of its movement follower 292 is carried to a socket 294 at the junction of arms 287 and 288. At this point the pickup arm has reached a point below which the beginning of the sound groove of a 10-inch record is disposed when threaded over the spindle 13. The brake mechanism including the cork surfaced spring 289 retains the pickup arm in this position until motion of the cam 279 in a reverse direction is sufficient to lower the pickup arm into engagement with the record. Before the arm is lowered, the follower 292 has been carried away from the arc through which arms 287 and 288 are adapted to swing so that the pickup arm may then be carried toward the axis of the turntable by the sound groove of a record thereon.

Should the pickup arm be moved outward as far as it will go either by gravity, owing to tilting of the entire mechanism, or arbitrarily in a manual manner, then on clockwise movement of lever 272 another cam 296 is adapted to be engaged by follower 292 to swing the pickup arm inwardly to the previously mentioned point so that it may engage a 10-inch record on the turntable.

Other means is provided for governing initial engagement of the pickup arm with a 12-inch record. It includes a finger 297 (Fig. 26) depending from the pickup arm P. As a 12-inch record is in the course of its transfer to the turntable it engages the finger 297. The record thereby moves the pickup arm farther outward to a second position after the follower 292 has been carried away from the socket 294. When the pickup arm is in its second position, it is poised above the beginning of the sound groove of the 12-inch record on the turntable. The record is then lowered onto the turntable T by the action of the elevator member 14 and out of engagement with the finger 297, which is short enough that no interference between it and the record occurs while the record is on the turntable. The pickup arm P is then lowered into engagement with the initial groove of the record whereupon the arm is free to track the record.

Figure 19:
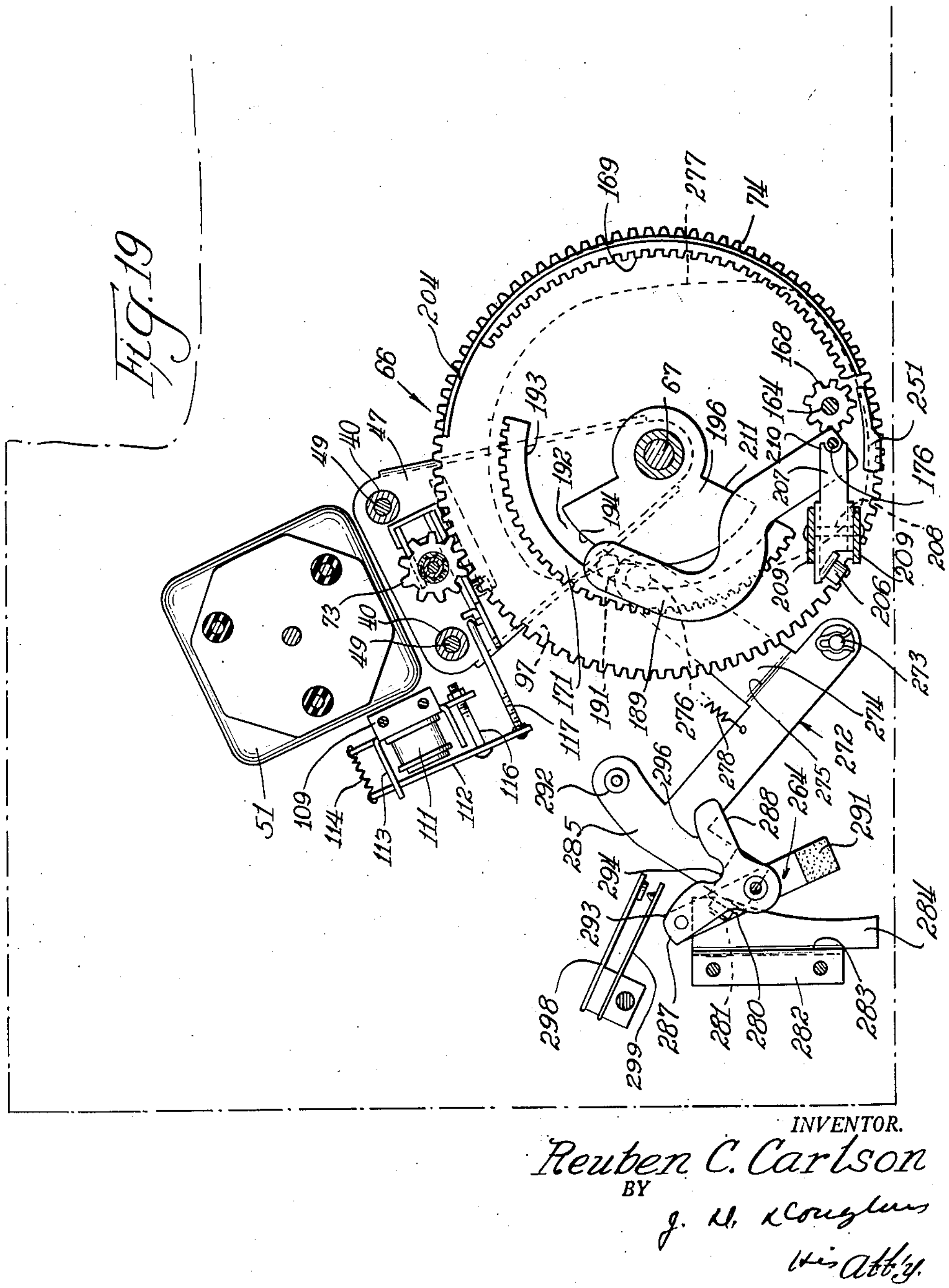
Fig. 19 is a transverse sectional view of the record changing mechanism, taken on line 19—19 of Fig. 10.

A record of either 10-inch or 12-inch size may be rejected either manually or automatically. For automatic rejection of a record, a normally open switch 298 is preferably supported from the lower side of base plate 19 (Fig. 19). Switch 298 is positioned in such a way that when the pickup arm P is carried inward to the terminal groove of the record it is tracking, the arm 287 strikes a flexible blade 299 of the switch 298 moving it until the switch is thereby closed. The switch 298 being in circuit with the electro-magnet 111, said magnet becomes energized and initiates a cycle of motion of cam wheel 66, whereupon the played record is replaced by an unplayed record by the means and in the manner hereinbefore described.

In order that the record may be manually rejected, a manually operable switch may also be in circuit with the electro-magnet 111. The second switch must be electrically wired in parallel to switch 298 and may be mounted in any convenient position on the cabinet where it is accessible to an operator of the phonograph apparatus, as indicated in my copending application filed on July 29, 1948, Ser. No. 41,388.

Having thus described my invention in an embodiment thereof, I am aware that numerous and extensive departures may be made therefrom without departing from the spirit or scope of the appended claims.

I claim:

1. Phonograph apparatus of the class described comprising a pair of trays each of which is adapted to support a plurality of records, one of the trays being at a level higher than the other tray, a turntable beside the trays, an ejector mechanism in association with one of the trays for engagement with the bottom record therein, said ejector mechanism being adapted to be moved through a cycle of operation, the axis of said bottom record being adapted to be carried into and then moved to a predetermined vertical plane by said ejector mechanism, movable record transfer mechanism in association with said turntable, said transfer mechanism when moved being adapted to engage the bottom record while moving in said predetermined plane and transfer it to the support of said turntable, and record elevator mechanism and in supporting engagement with said bottom record while said record is moved to said turntable, said elevator mechanism and said transfer mechanism also providing for removal of a record from the turntable to the second of the trays.

2. Phonograph apparatus of the class described comprising first and second trays each of which is adapted to support a plurality of records, the first tray being above the second tray, a turntable having a central spindle beside the trays, an ejector mechanism including spaced apart fingers in association with the bottom of said first tray for engagement with the bottom record therein, said fingers being adapted to be moved through a cycle of operation, said bottom record being adapted to be moved by said fingers so that its axis is carried into and then moved to a predetermined vertical plane between said fingers, record transfer mechanism including a record center hole engageable pin normally in association with said spindle, said pin being adapted to be carried over the bottom record while moving in said predetermined plane for engagement with its center hole, and record elevator mechanism to support said bottom record while it is moved to said turntable, said elevator mechanism and said transfer mechanism also providing for removal of a record from the turntable to the other of the trays.

3. Phonograph apparatus comprising a cabinet having a horizontal slot in one of the walls thereof, a pair of trays within the cabinet at different levels, one of the trays being adapted to receive records passed through the slots, a turntable beside the trays, an ejector mechanism in association with one of the trays for engagement with the bottom record therein, said ejector mechanism being adapted to be moved through a cycle of operation, the axis of said bottom record being adapted to be carried into and then moved to a predetermined vertical plane by said ejector mechanism, movable record transfer mechanism in association with said turntable, said transfer mechanism when moved being adapted to engage the bottom record while moving in said predetermined plane and then transfer it to the support of said turntable, and pivotally movable record elevator mechanism in supporting engagement with said bottom record while said record is moved to said turntable, said elevator mechanism and said transfer mechanism also providing for removal of a record from the turntable to the other of the trays.

4. In an automatic record player for playing records of different sizes and having record reproducing means including a horizontal turntable and a transfer mechanism to position a record thereon and remove it therefrom, the combination of, magazine means including a horizontal base member beside the turntable, confining means including a vertical member supported from said base member to confine thereon a plurality of records within a predetermined area, said confining means providing spaced relationship between said vertical member and said base member to provide a horizontal record passage adjacent the turntable through which a record may be ejected from said magazine means, an elevation of uniform height on said base member extending transversely thereof from said record passage to provide support for the bottom record at a region linearly thereof, said base member having a slot on either side of said elevation, ejector mechanism including a pair of fingers spaced one from the other a distance less than the diameter of the smallest size record and extending through said slots and adapted to project high enough above the level of said elevation to engage only the bottom record in said magazine means, said fingers also being adapted to be moved forward and backward to eject said bottom record through said record passage for engagement by the record transfer mechanism, a safety member movably anchored to said vertical member at said record passage, and resilient means to bias said safety member to a predetermined position wherein it is adapted to retain the records above said bottom record within said magazine means when said fingers are reciprocated, said safety means also being adapted to be displaced upwardly by a record of abnormal formation to allow ejection thereof through said record passage.

5. In apparatus of the class described including sound reproducing means supported from a frame on which is carried a horizontal turntable and a magazine above the level of the turntable, the magazine being adapted to eject a record therefrom in a horizontal plane toward the turntable, in combination, cyclically operated rotary mechanism carried by the frame, said rotary mechanism being adapted to be operated on rejection of a record, a vertical member movably supported by said frame beside the turntable and spaced toward the magazine from a center line through the turntable normal to the line of travel of a record passing from the magazine to the turntable, record engageable mechanism carried by said vertical member, said record engageable mechanism being adapted to be swung over said turntable from the axis thereof to a predetermined position through which the axis of the record is adapted to be carried on ejection from the magazine, traction means associated with said vertical member, said traction means being adapted to move said record engageable mechanism into cooperative association with the record when said rotary mechanism is operated, torsional operating means in communication with said vertical member and said rotary mechanism by which the record is adapted to be moved to a point whereat it is in coaxial relationship to the turntable, and vertically movable elevator means pivotally associated with said turntable, said elevator means being normally below the level of said turntable but movable to a level above said turntable to support said record when it is moved to coaxial relationship with said turntable by said record engageable means, said elevator means being adapted to lower the record to the support of the turntable in response to additional operation of said rotary mechanism.

6. In apparatus of the class described including sound reproducing means supported from a frame on which is carried a horizontal turntable and a magazine above the level of the turntable, the magazine being adapted to eject a record therefrom through a horizontal plane, in combination, cyclically operated rotary mechanism carried by the frame, said rotary mechanism being adapted to be operated on rejection of a record, a vertical shaft movably supported by said frame beside the turntable and spaced toward the magazine from a center line through the turntable normal to the line of travel of a record passing from the magazine to the turntable, record engageable mechanism carried by said shaft, said latter mechanism including an arm having record hole engaging means the length of the arm being such as to enable it to be in alignment with the center of a record on the turntable being arranged to be swung from over said turntable and to a predetermined position adjacent said magazine in alignment with the axis through which a record is carried when the record is ejected from the magazine, traction means associated with said shaft, said traction means being adapted to move said record engageable mechanism vertically into cooperative association with the record when said rotary mechanism is operated, resilient means anchored to said record engageable mechanism to bias said record engageable mechanism to said predetermined position, torsional means in communication with said shaft and said rotary mechanism by which the record is adapted to be moved by said record engageable mechanism against the resistance of said resilient means to a point whereat it is in coaxial relationship to the turntable, vertically movable support means pivotally associated with said turntable to support said record when it is moved to coaxial relationship with said turntable by said record engageable means, said vertical support means being adapted to lower the record to the support of the turntable in response to additional operation of said rotary mechanism, and latch means in connection with said shaft and said frame by which said record engageable mechanism is adapted to provide cooperation between said record engageable mechanism and said record when the record is lifted upward by operation of said vertically movable element on rejection of a record, said resilient means being adapted to discharge a record away from the turntable while said record is being moved upward.

7. In an automatic record player having sound reproducing apparatus including a frame for support of a horizontal turntable beside which a horizontal magazine having in the side thereof adjacent the turntable a horizontal aperture through which a phonograph record is ejected, in combination, record transfer mechanism including a vertical shaft, bearing means on said frame by which said shaft is rotatably and vertically movable, record moving mechanism including a record engageable pin movable vertically with respect to said shaft, first resilient means anchored to said record moving mechanism to bias said pin downward, cyclically operated rotary mechanism carried by said frame, second resilient means in connection with said frame by which said shaft is biased upwardly to provide a raised position for said pin, third resilient means coupled to said record moving mechanism to bias said pin laterally, said pin being thereby moved laterally over the course through which the center hole of a record is carried when ejected from the magazine, a vertically movable record elevator in association with said turntable, said elevator being normally below the level of the turntable but adapted to be raised above the level thereof to the plane of said horizontal aperture in response to operation of said rotary mechanism to provide support for a record when ejected from the magazine, traction mechanism between said rotary mechanism and said shaft by which said shaft is adapted to be pulled to a downward position and said pin carried against said record when said rotary mechanism is operated, the center hole of said record being adapted to be thereby threaded over the pin as the record is moved thereunder on ejection from the magazine, torsion means carried by said shaft, cam means on said rotary member cooperatively associated with said torsion means to swing said pin into coaxial relationship with the axis of the turntable, said record elevator being then adapted to lower the record to the support of the turntable wherein it is in disengagement with said pin in response to further motion of said rotary member, said cam means maintaining said pin in its coaxial relation to the turntable axis during record playing, said vertically movable record carrier being adapted to lift the record from the turntable and rethread it over said pin on resumption of cyclic motion of said rotary member, said torsion means being adapted to be released from said cam means in timed relationship to operation of said elevator to enable said third resilient means to swing said pin laterally for discharge of the record from the turntable before said record carrier has been moved to its upward position.

8. In an automatic record player having sound reproducing apparatus including a frame for support of a horizontal turntable beside which a horizontal magazine having in the side thereof adjacent the turntable a horizontal aperture through which a phonograph record is ejected, in combination, record transfer mechanism including a vertical shaft, means in connection with said frame by which said shaft is rotatably and longitudinally movable, a mobile arm on said shaft, a vertical record engageable pin slidably supported by said arm, first resilient means anchored to said arm to bias said pin downward, cyclically operated rotary mechanism carried by said frame, means coupled to said rotary mechanism including ejector mechanism by which said record is adapted to be ejected from said magazine is response to operation of said rotary mechanism, second resilient means in connection with said frame by which said shaft is bised upwardly to provide a raised position for said arm and pin, third resilient means coupled to said swingable member to bias said pin laterally when it is held upwardly by said second resilient member, said pin being thereby moved laterally over the course through which the center hole of a record is carried when ejected from the magazine, a vertically movable record elevator normally below the level of the turntable but adapted to be raised above the level of the turntable to an upward position at the plane of said horizontal aperture in response to operation of said rotary mechanism to provide support for a record when ejected from the magazine, traction mechanism between said rotary mechanism and said shaft by which said shaft is adapted to be pulled to a downward position and said pin carried against said record when said rotary mechanism is operated, the center hole of said record being thereby threaded over the pin by downward force of said first resilient means, follower means carried by said shaft, cam means on said rotary member cooperatively associated with said follower means to swing said pin into coaxial relationship with the axis of the turntable, said record elevator being then adapted to lower the record to the support of the turntable wherein it is in disengagement with said pin in response to further motion of said rotary member for reproduction of the record, and a latch mechanism on said frame for cooperation with the shaft to maintain said pin in its downward position during record playing, said vertically movable record carrier being adapted to lift the record from the turntable and rethread it over said pin on resumption of cyclic motion of said rotary member, said follower means being adapted to be operated in timed relationship to operation of said record carrier to allow said third resilient means to swing said pin laterally before said record carrier has been moved to its full upward position, said latch mechanism being released after a predetermined lateral movement to allow said second resilient means to disengage said pin from said record as it is thus thrown clear of the record reproducing apparatus.

9. A record changer comprising a magazine, a turntable disposed in horizontal spaced relation to said magazine, ejector means in said magazine adapted to slide the bottom record therein to a partially ejected position, arm means mounted beside said turntable arranged to engage said record to continue the ejection of said record from said magazine to said turntable, record elevator means adjacent said turntable and being pivotally movable relative thereto to support said record during the ejection and to lower said record into engagement with the turntable as said ejection is completed.

10. An automatic record player for playing different sized records and having a turntable and record magazine adjacent said turntable disposed in a frame from which records are singly ejected in a horizontal position, record transfer means being operable to transfer records between said turntable and magazine, elevator means embracing said turntable and normally disposed below the level of said turntable, resilient means connected between one end of said elevator means and said frame, cyclically operable mechanism engaging said record transfer means to move said transfer means through a cycle of motion, cam means on said cyclically operable mechanism in engagement with said elevator means being operable in timed relationship to raise the end of said elevator means opposite to said resilient connection to an inclined position relative to said turntable to remove a record from said turntable and to raise the end of said elevator means connected to said resilient means to the same horizontal level as said opposite end in preparation to receiving a record from said magazine, and means on said opposite raised end of said elevator means engaging said frame to limit the upward travel of said raised end.

11. The device as defined in claim 10, and wherein arm means extending downward from said elevator means adjacent said resilient means are in engagement with latch means movably attached to said frame being operable to prevent upward movement of the end of said elevator means connected to said resilient means during the initial upward movement of the end of the said elevator means opposite to said resilient means.

References Cited in the file of this patent

UNITED STATES PATENTS

| | | |
|---|---|---|
| 1,593,112 | Wilson | July 20, 1926 |
| 1,802,831 | Pittman | Apr. 28, 1931 |
| 1,818,645 | O'Neill | Aug. 11, 1931 |
| 1,855,156 | Seabolt | Apr. 19, 1932 |
| 1,942,613 | Nystrom | Jan. 9, 1934 |
| 1,962,858 | Collison et al. | June 12, 1934 |
| 1,990,886 | Winchell | Feb. 12, 1935 |
| 1,993,073 | Nystrom | Mar. 5, 1935 |
| 2,064,777 | Winchell | Dec. 15, 1936 |
| 2,109,322 | Small | Feb. 22, 1938 |
| 2,339,981 | Cranmer et al. | Jan. 25, 1944 |
| 2,370,875 | Pressley | Mar. 6, 1945 |
| 2,371,361 | Small | Mar. 13, 1945 |
| 2,387,916 | Knox | Oct. 30, 1945 |
| 2,421,909 | Roe | June 10, 1947 |